US 9,833,858 B2

(12) United States Patent
Sammons

(10) Patent No.: US 9,833,858 B2
(45) Date of Patent: Dec. 5, 2017

(54) SYSTEM AND METHOD FOR WELDING SYSTEM CABLE MANAGEMENT

(71) Applicant: Michael Allen Sammons, Appleton, WI (US)

(72) Inventor: Michael Allen Sammons, Appleton, WI (US)

(73) Assignee: Illinois Tool Works Inc., Glenview, IL (US)

(*) Notice: Subject to any disclaimer, the term of this patent is extended or adjusted under 35 U.S.C. 154(b) by 762 days.

(21) Appl. No.: 13/839,638

(22) Filed: Mar. 15, 2013

(65) Prior Publication Data

US 2014/0069904 A1 Mar. 13, 2014

Related U.S. Application Data

(60) Provisional application No. 61/698,103, filed on Sep. 7, 2012.

(51) Int. Cl.
*B23K 9/00* (2006.01)
*B23K 9/32* (2006.01)
(Continued)

(52) U.S. Cl.
CPC .............. *B23K 9/321* (2013.01); *B23K 9/323* (2013.01); *B23K 11/24* (2013.01); *H01R 13/46* (2013.01);
(Continued)

(58) Field of Classification Search
CPC .......... B23K 9/323; B23K 9/321; B23K 9/32; H01R 13/645; H01R 13/52; H01R 13/502
(Continued)

(56) References Cited

U.S. PATENT DOCUMENTS 3,629,547 A * 12/1971 Kester .................... B23K 9/295
174/15.7
4,295,005 A 10/1981 Daugherty
(Continued)

FOREIGN PATENT DOCUMENTS

DE 10155414 5/2003
DE 202012002162 5/2012
(Continued)

OTHER PUBLICATIONS

International Search Report from PCT application No. PCT/US2013/058589 dated Dec. 10, 2013, 12 pgs.

*Primary Examiner* — Quang D Thanh
*Assistant Examiner* — Ayub Maye
(74) *Attorney, Agent, or Firm* — McAndrews, Held, & Malloy, Ltd.

(57) ABSTRACT

Embodiments of the present disclosure include a cable management system with a housing comprising a first shell and a second shell configured to couple together about welding system cabling such that a portion of the welding system cabling is contained by the housing. The first and second shells form openings at ends of the housing such that the welding system cabling is capable of extending through the openings and such that edges of the openings enclose a perimeter of the welding system cabling when the first and second shells are coupled together about the welding system cabling. A cradle receives a weld cable of the welding system cabling. A cable clamp engages the weld cable and cooperates with the cradle to restrict movement of the weld cable when the weld cable is disposed in the cradle and the cable clamp is engaged.

19 Claims, 14 Drawing Sheets

(51) Int. Cl.
  *H02G 3/06* (2006.01)
  *H02G 15/007* (2006.01)
  *H01R 13/502* (2006.01)
  *H01R 13/58* (2006.01)
  *B23K 11/24* (2006.01)
  *H01R 13/46* (2006.01)
  *H02G 15/06* (2006.01)
  *H02G 15/113* (2006.01)

(52) U.S. Cl.
  CPC ....... *H01R 13/502* (2013.01); *H01R 13/5812* (2013.01); *H02G 3/0616* (2013.01); *H02G 15/007* (2013.01); *H02G 15/06* (2013.01); *H02G 15/113* (2013.01); *H02G 3/0633* (2013.01); *H02G 3/0683* (2013.01)

(58) Field of Classification Search
  USPC .......... 219/136, 75, 137.9, 139; 175/50, 135
  See application file for complete search history.

(56) References Cited

U.S. PATENT DOCUMENTS

| | | | | |
|---|---|---|---|---|
| 5,415,562 A | * | 5/1995 | Matsumoto | H01R 4/2433 439/397 |
| 5,569,882 A | | 10/1996 | Yokoyama | |
| 5,571,427 A | * | 11/1996 | Dimock | B23K 9/296 219/136 |
| 5,941,728 A | * | 8/1999 | Okabe | H01R 4/2454 439/467 |
| 5,965,045 A | * | 10/1999 | Zigliotto | B23K 9/32 219/137.31 |
| 6,078,023 A | * | 6/2000 | Jones | B23K 9/323 219/137.62 |
| 6,523,584 B1 | * | 2/2003 | Rehrig | H02G 3/0481 150/154 |
| 6,533,472 B1 | * | 3/2003 | Dinh | G02B 6/4447 385/135 |
| 7,511,245 B2 | * | 3/2009 | Hsu | B23K 9/201 219/98 |
| 2003/0209524 A1 | | 11/2003 | Delgado | |
| 2012/0067157 A1 | * | 3/2012 | Suzuki | B25J 19/0025 74/490.02 |

FOREIGN PATENT DOCUMENTS

| | | |
|---|---|---|
| EP | 0484125 | 5/1992 |
| EP | 2026420 | 2/2009 |
| GB | 2212294 | 7/1989 |

* cited by examiner

SYSTEM AND METHOD FOR WELDING SYSTEM CABLE MANAGEMENT

CROSS-REFERENCE TO RELATED APPLICATION

This application claims priority from and the benefit of U.S. Provisional Application Ser. No. 61/698,103, entitled "WELD CABLE PROTECTION SYSTEM," filed Sep. 7, 2012, which is hereby incorporated by reference in its entirety for all purposes.

BACKGROUND

The present disclosure relates generally to the field of welding systems, and more particularly to systems and methods for managing cables of a welding system.

A welding system generally includes multiple cables that connect components of the welding system. These cables may be referred to as welding system cabling. This welding system cabling may be grouped together to form what may be referred to as an umbilical cord for the welding system. In general, welding system cabling, such as that forming an umbilical cord, typically includes a control cable and a weld cable. However, welding system cabling may include any number of different types of cabling for providing connections between components (e.g., a power supply and wire feeder) of the welding system. For example, the welding system cabling may include interconnecting components such as the weld cable, the control cable (communication cable), gas hoses, water hoses, or other elements utilized in welding operations.

During operation of a welding system, the welding system cabling is often subjected to a harsh environment due to the welding process and related environmental conditions. Furthermore, the cabling is often subjected to physical stresses and strains associated with movement of system components that are coupled together by the cabling. The welding environment and stress applied during movement of system components can result in damage to the cabling. Indeed, certain cables may be particularly susceptible to damage because they are less robust than others. As such, the reliability of the system may be dependent on the durability of the cables. Accordingly, present embodiments are directed to improving cable management for welding systems, which includes providing protection of welding system cabling from damage and ready access to cabling for maintenance and repairs.

BRIEF DESCRIPTION

Embodiments of the present disclosure include a cable management system with a housing comprising a first shell and a second shell configured to couple together about welding system cabling such that a portion of the welding system cabling is contained by the housing. The first and second shells form openings at ends of the housing such that the welding system cabling is capable of extending through the openings and such that edges of the openings enclose a perimeter of the welding system cabling when the first and second shells are coupled together about the welding system cabling. A cradle receives a weld cable of the welding system cabling. A cable clamp engages the weld cable and cooperates with the cradle to restrict movement of the weld cable when the weld cable is disposed in the cradle and the cable clamp is engaged.

BRIEF DESCRIPTION OF THE DRAWINGS

Advantages of the present disclosure may become apparent upon reading the following detailed description and upon reference to the drawings in which like reference numerals indicate like parts.

DETAILED DESCRIPTION

Figure 1:
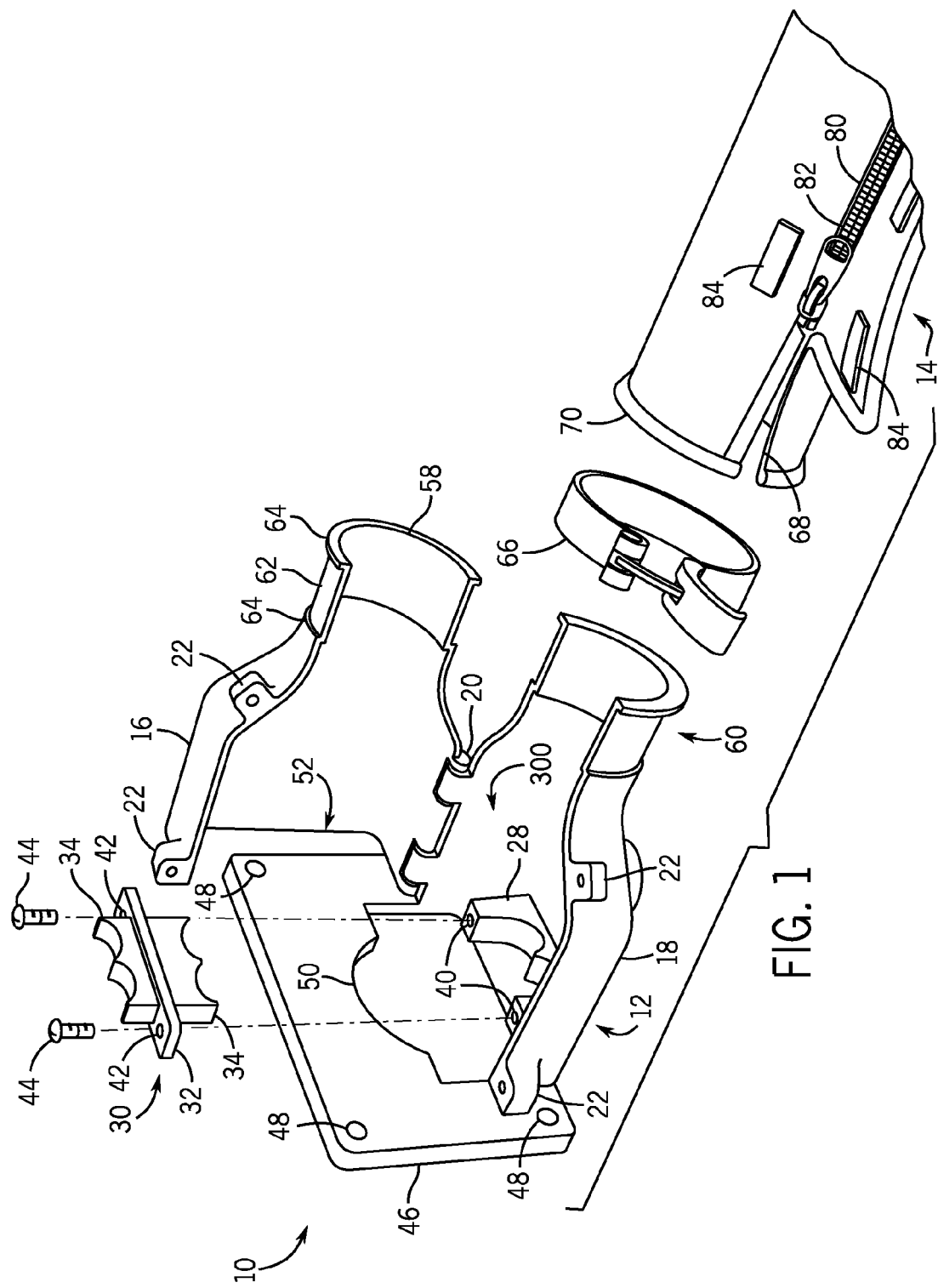
FIG. 1 is a perspective view of a cable management system including a housing and a protective cable sheath, wherein the housing is open and decoupled from the protective cable sheath in accordance with present embodiments.

Embodiments of the present disclosure include improvements to features associated with a welding system. In particular, it has now been recognized that the control cable or communication cable of a welding system is particularly susceptible to damage during use of the welding system. Further, it has now been recognized that it is desirable to provide easier access to cabling associated with the welding system when repairs or maintenance are needed. Accordingly, present embodiments include cable management systems and methods that provide cable protection and facilitate access to the cables (e.g., the cabling forming an umbilical cord) of a welding system. For example, present embodiments include a separable housing (e.g., a clam-shell housing) and cable engagement features, wherein the housing and cable engagement features cooperatively function to provide a protective barrier around welding system cabling, stress management with respect to the cabling, and ready access to the cabling within the housing.

The housing may include two shells (in a clam-shell orientation or a plug and outer shell orientation) that are arranged to couple or join together about welding system cabling. The engagement features, which may be coupled with or integral to the housing, are designed to engage with one another to capture a weld cable of the welding system cabling. Capturing the weld cable, which is typically more robust than other cables of the welding system cabling, with the engagement features (e.g., a cradle and a cable clamp) restricts movement of the weld cable with respect to the housing. Accordingly, present embodiments focus stresses associated with movement of the cabling (e.g., stress from snagging the cabling when moving system components coupled by the cabling) on the weld cable and the housing rather than on weaker cables (e.g., a control cable) that are also part of the welding system cabling but are essentially freely moveable within the housing. This provides a more robust and reliable system that needs fewer repairs. However, if it is desirable to access the cabling, the separable housing provides a user with ready access to the cabling by simply opening the housing. This allows for cabling repairs, for example, without having to remove the cabling from the housing and without having to thread cable back through the housing. Accordingly, present embodiments simplify assembly and maintenance procedures of the welding system relative to traditional systems.

Present embodiments also include a protective jacket or sheath that is designed to couple with the housing and about the cabling such that is becomes a part (e.g., a protective outer layer) of the umbilical system. The housing and the protective jacket may be utilized together or separately. Specifically, the protective cable sheath functions as a protective outer layer of the cabling that is not disposed within the housing. An objective of this jacket is to contain and protect all of the components of the interconnecting system, which includes the cabling. Another objective of this jacket is to be able to assemble and maintain the system with minimal effort. To accomplish this, the jacket is split along its length in a manner that allows for a separation of the circular continuity. The separation allows the jacket to lay flat such that the components (e.g., cabling) can be laid on top of the jacket in the flat position prior to installation. Once all the components of the system are on top of the jacket, the jacket can be closed in a tubular manner with one or more fasteners (e.g., nails, screws, bolts, pins, etc.). For example, a combination of fastening tape (e.g., opposing pieces of fabric with hooks and loops) and a zipper may function together as the fasteners. The zipper may aid in the speed of assembly, and the fastening tape may protect the zipper from the welding environment.

Turning to the illustrated embodiments, FIG. 1 is a perspective view of a cable management system 10 that functions to protect and bundle cabling (e.g., a weld cable, a control cable, gas hoses, water hoses) of a welding system in accordance with present embodiments. The cable management system 10 may protect the cables from the harsh welding environment, may prevent the cables from being snagged or tangled when the welding system is in use, and may increase durability of the welding system by controlling the focus of stress applied to the cables within the cable management system 10.

The system 10 includes a housing 12 and a protective cable sheath 14 that are designed or configured to couple together. As discussed above, the welding system may include multiple cables and hoses that connect other components of the welding system. The cable management system 10 is designed to contain and route a number of such cables and hoses, which may be referred to as welding system cabling. While the cable management system 10 in the illustrated embodiment of FIG. 1 includes both the housing 12 and the protective cable sheath 14, in other embodiments, the cable management system 10 may merely include the housing 12 or the protective cable sheath 14.

Figure 2:
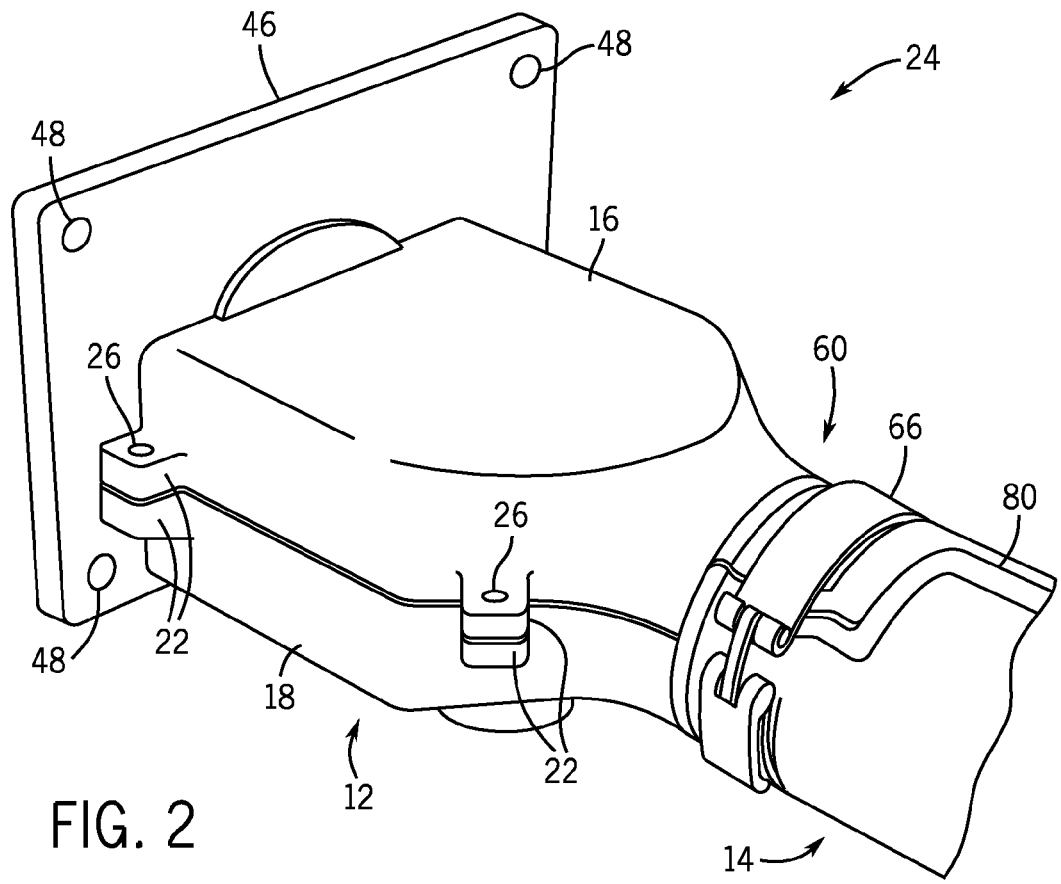
FIG. 2 is a perspective view of the housing and protective cable sheath of FIG. 1, wherein the housing is closed and coupled with the protective cable sheath in accordance with present embodiments.

In the illustrated embodiment, the housing 12 includes a first shell 16 and a second shell 18 in a clam-shell arrangement about a hinge 20. The first shell 16 and second shell 18 also include engagement features 22 that are configured to align when the housing 12 is closed to facilitate securing the first shell 16 and second shell 18 together about welding system cabling. Thus, the housing 12 may protect the connection components or cabling of the welding system from the harsh conditions of a welding environment and may prevent particulates from contaminating the cabling. In the illustrated embodiment, the engagement features 22 include tabs that extend from and are integral with the housing 12. Specifically, the first shell 16 includes tabs that line up with tabs of the second shell 18 when the first shell 16 and second shell 18 are rotated into a closed orientation 24, as shown in FIG. 2. Once the engagement features 22 are aligned and adjacent to one another, one or more fasteners 26 may secure them together. For example, in the embodiment illustrated by FIG. 2, the fasteners 26 are screws. In other embodiments, different fasteners 26 and different engagement features 22 may be utilized. For example, the engagement features 22 may come together with one another to form a recess in an outer portion of the housing 12 configured to receive a band clamp functioning as the fastener 26.

As indicated above, the clam-shell housing 12 includes the hinge 20 coupling the first shell 16 and the second shell 18 along an edge of each. This edge of the housing 12 may be referred to as a hinged edge. For purposes of providing stable securement of the first shell 16 to the second shell 18, it may be desirable to include the engagement features 22 opposite the hinged edge on the respective first shell 16 and second shell 18. However, the engagement features 22 may be included in various locations (e.g., along edges, through the middle, and around the perimeter of the housing 12). Further, it should be noted that the ability to open the housing 12 by rotating one of the first and second shells 16, 18 about the hinge 20 may provide quick and simple access to components (e.g., welding system cabling) within the housing 12.

The housing 12 may include rigid casing and may be formed from a variety of materials, such as plastics, metals, metal alloys, other suitable materials, or a combination thereof. The geometry of the first and second shells 16, 18 and the associated internal volume of the housing 12 when the first and second shells 16, 18 are in a closed configuration may enable the housing to enclose a plurality of cables without deformation. However, it may be desirable to deform the weld cable in a manner that essentially couples the weld cable to the housing 12. As discussed above, the weld cable is typically considered a robust cable and it may be desirable to utilize the housing 12 to make the weld cable the focus of stresses associated with movement of the cabling. Indeed, the housing 12 may include a cradle 28 and a cable clamp 30 that function together to engage with the weld cable to restrict movement of the weld cable such that stresses associated with movement of cabling disposed within the housing 12 are focused on the weld cable and the housing 12, not on less robust components of the cabling. In particular, by transferring the forces to the weld cable, the more fragile control cable may be protected. Thus, the reliability of the welding system may be improved.

In the illustrated embodiment, the cradle 28 is integral with the second shell 18 and the cable clamp 30 is a separate component configured to couple with the housing 12. In other embodiments, the cradle 28 and/or the cable clamp 30 may be integral components of the housing 12 or separate components capable of cooperating (e.g., coupling with) the housing 12. When the cradle 28 or cable clamp 30 are integral with one of the first or second shells 16, 18, the features may be manufactured as a single piece via a molding process. The cradle and cable clamp geometries may resemble slots, notches, trenches, channels, recesses, and the like to facilitate receiving and engaging the weld cable.

In the illustrated embodiment, the cradle 28 extends from the second shell 18 into what becomes an internal volume of the housing 12 when in the housing 12 is in the closed configuration 24 (FIG. 2). The cable clamp 30 includes a bracket 32 that is reversible and includes asymmetrical extensions 34 on either side. The asymmetry of the extensions 34 allows the bracket 32 to be installed in different orientations depending on a desired coupling effect. For example, it may be desirable for the extensions 34 to extend further toward the cradle 28 to secure a relatively small weld cable. In the illustrated embodiment of FIG. 1, the extensions 34 on the upper side of the bracket 32 are shorter than the extensions 34 on the lower side of the bracket. Accordingly, if the cable clamp 30 is installed in the orientation illustrated in FIG. 1, it will be better adapted to secure a relatively small weld cable than it would be if installed in the reverse orientation.

With regard to securing the weld cable using the cable clamp 30 and the cradle 28, present embodiments include features for forcing the cable clamp 30 and the cradle 28 together about the weld cable. In the illustrated embodiment, the cradle 28 includes engagement features 40 that are designed to align with engagement features 42 of the cable clamp 30 to facilitate securing the cable clamp 30 to the cradle 28 via fasteners 44, which include screws in FIG. 1. In other embodiments, different securing mechanisms and arrangements may be utilized. In some embodiments, the cable clamp 30 and cradle 28 may be arranged with respect to one other (e.g., as integral components of the housing 10) such that they cooperate to secure a weld cable when the housing 10 is in the closed orientation 24. Further, in other embodiments, the cable clamp 30 and/or the cradle 28 may secure to different features (not each other) of the cable management system 10 in a manner that facilitates securing the weld cable between the cradle 28 and cable clamp 30. In the illustrated embodiment, the fasteners or screws 44 may be tightened to strengthen engagement of the cradle 28 and cable clamp 30 about the weld cable.

In the embodiment illustrated by FIG. 1, the housing 12 includes geometric features that facilitate coupling of the housing 12 to other features. For example, the second shell 18 includes a mounting plate 46 that includes engagement features (e.g., holes through the mounting plate) 48 to facilitate coupling of the housing 12 to a welding system component, such as power supply or wire feeder. The mounting plate 46 is shown in a perpendicular orientation with respect to the length of the housing 12, but other embodiments include one ore more mounting plates in parallel orientations with respect to the length of the housing 12 and coupled to or integral with other portions of the housing 12. Also, while the engagement features 48 are illustrated as holes, the engagement features 48 could include extensions, snaps, or the like. Further, the housing 12 includes geometric features that provide pathways or openings through which the cabling can extend out of the housing 12 or through which access is provided into the housing 12. For example, the mounting plate 46 includes an opening 50 that cooperates with a corresponding curve or recess 52 in the first shell 16 when the housing is in the closed orientation 25 to provide access to the interior volume of the housing 12 or a pathway through which cabling can extend out of the housing 12. When the housing 12 is in the closed orientation 24, edges of the opening 50 are surrounded or formed by the first and second shells 16, 18. This opening 50 may allow the cabling to extend out of the housing 12 or coupling features to extend into the housing 12 for coupling with the cabling inside the housing 12.

Each end of the housing 12 of FIG. 1 includes geometric features that provide openings and coupling features. Not only does the end with the mounting plate 46 include an opening, but the first and second shells 16, 18 couple together to form the edges of another opening 58 through which cabling can extend. Specifically, as can be seen in FIG. 1, when the first and second shells 16, 18 are joined, a substantially circular opening 58 is formed. Indeed, the coupled first and second shells 16, 18 form what may be referred to as a port structure 60 that includes the opening 58. Furthermore, the port structure 60 includes a channel 62 along the perimeter of the port structure 60, which facilitates coupling of the housing 12 to the protective cable sheath 14.

Specifically, the protective cable sheath 14 may pass over one or both lips 64 of the channel 62 such that a band clamp 66 can then be coupled about the protective cable sheath 14 and the housing 12 and within the channel 62 to secure the housing 12 and the protective cable sheath 14 together. The protective cable sheath 14 may include a slit 68 at a distal end 70 to facilitate engagement with the port structure 60. In other embodiments, the protective cable sheath 14 may be coupled to the housing 12 via any type of clamp, interference fit, adhesive, another method, or a combination thereof. Engagement of the protective cable sheath 14 and the housing 12 in the manner discussed above may provide a substantial seal about the welding system cabling, which may provide added protection from the welding environment.

The protective cable sheath 14 and housing 12 are shown coupled together by the band clamp 66 in FIG. 2. By coupling the protective cable sheath 14 about the cabling and with the housing 12, the protective cable sheath 14 may partially absorb stresses associated with movement of the cabling and transfer stresses to the housing 12 as well. The protective cable sheath 14 may also provide added protection and ease of accessibility by enclosing the connection components or cabling in an organized arrangement along a length between components of the welding system (e.g., between a power supply and a wire feeder). Further, the protective cable sheath 14 may protect the cabling outside of the housing 12 from the environmental conditions while providing accessibility for repair, maintenance, installation, and so forth.

The protective cable sheath 14 may include thick cloth, rubber, flexible plastic, another suitable material, or a combination thereof. The material of the protective cable sheath 14 may be specifically designed for particular welding environments to protect internal cabling from damage. Further, to enable access to the cabling, the material of the protective cable sheath 14 may contain a slit 80 (e.g., a linear split or spiral split) along its axial direction that separates the circular continuity of its cross-section. The slit 80 may allow the protective cable sheath 14 to be laid flat for assembly purposes. The protective cable sheath 14 may incorporate various methods to close the slit 80, such as a zipper 82, fastening tape (e.g., hook-and-loop material) 84, buttons, snaps, ties, clasps, clamps, other methods, or a combination thereof. Such closure methods may provide a tight seal along the slit 80 and prevent particulates and/or heat from damaging the cabling. Further, the above listed system components and methods may provide ready access (e.g., without requiring tools) to cabling within the protective cable sheath 14 during maintenance and/or assembly of the welding system.

Figure 3:
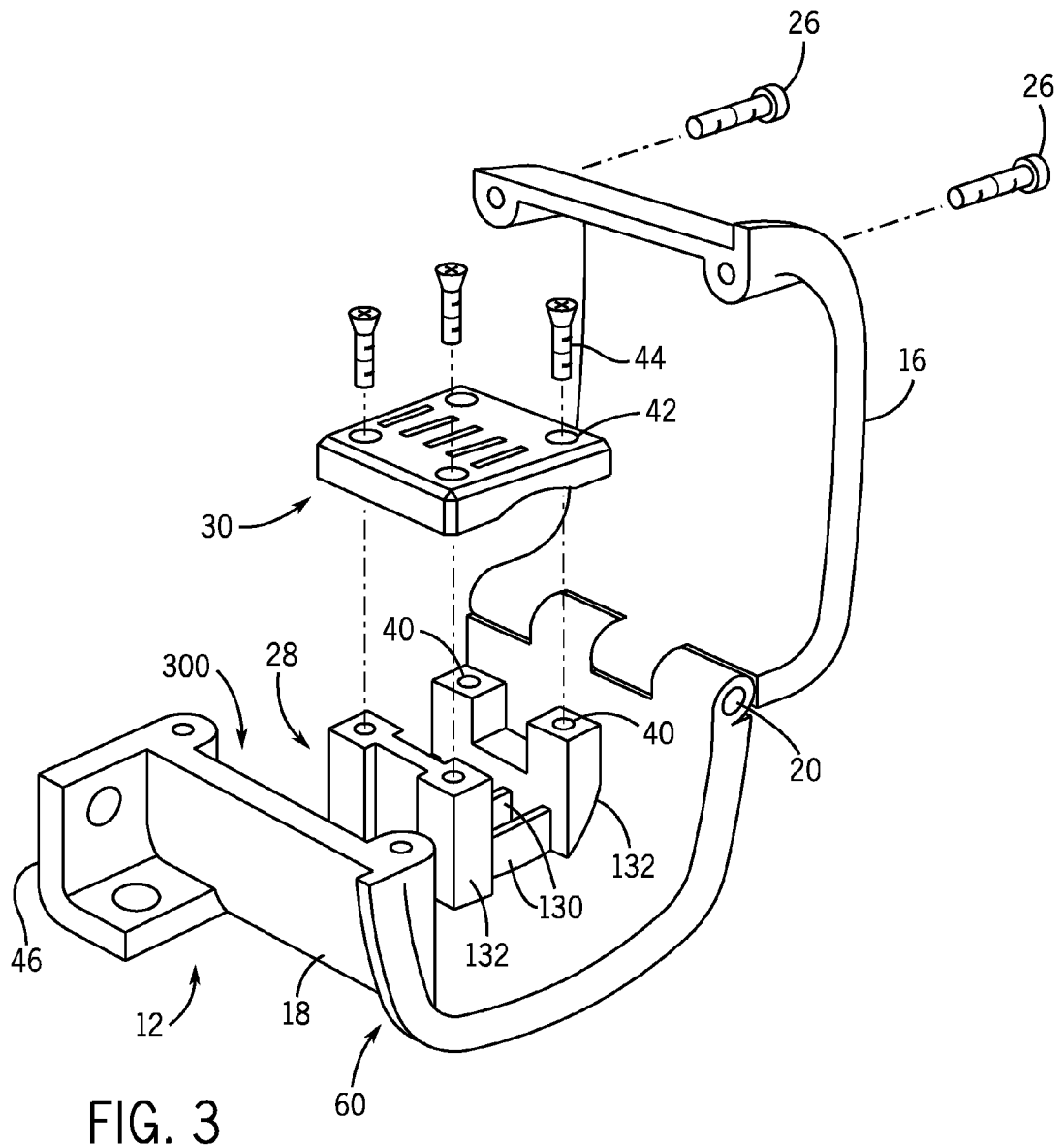
FIG. 3 is a perspective view of a housing including a clam-shell configuration and illustrating an exploded view of a cable clamp and cradle assembly in accordance with present embodiments.

FIG. 3 is a perspective view of another embodiment of the cable management system 10. In the embodiment illustrated by FIG. 3, the housing 10 includes the first and second shells 16, 18 in a clam-shell arrangement about the hinge 20. Further, the embodiment illustrated in FIG. 3 includes the cradle 28 as an integral component of the second shell 18 and the cable clamp 30 as a separate component that is configured to be coupled with the cradle 28. The cradle 28 and the cable clamp 30 of FIG. 3 include different geometric features relative to their counterparts in FIG. 1. Thus, the embodiment illustrated by FIG. 3 provides a different clamping strategy relative to the embodiment illustrated by FIG. 1.

Figure 4:
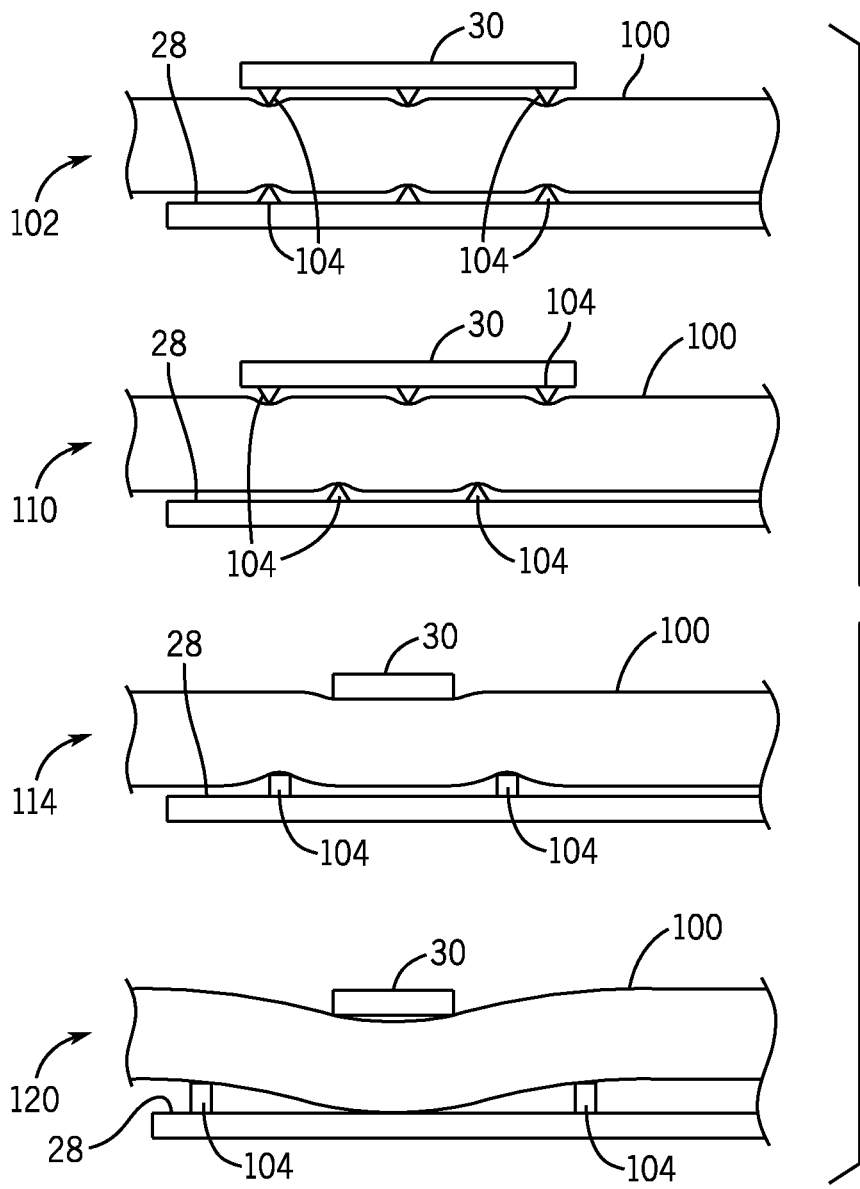
FIG. 4 includes various cross-sectional views of a weld cable positioned between a cradle and cable clamp to demonstrate different clamping strategies in accordance with present embodiments.

Various different clamping strategies may be employed in accordance with present embodiments, as illustrated in FIG. 4. Specifically, FIG. 4 illustrates a weld cable 100 positioned between the cradle 28 and the cable clamp 30 employing various different clamping strategies. In a first clamping strategy 102, directly opposing walls, teeth or ribs 104 of the cradle 28 and cable clamp 30 deform an outer portion of the weld cable 100 to create a gripping engagement. This may include deforming or slightly puncturing a sheath about the weld cable. A second clamping strategy 110 is similar to the first clamping strategy 102 but includes the teeth or ribs 104 in an offset arrangement rather than a directly opposing arrangement. A third clamping strategy 114 include the walls, teeth, or ribs 104 extending upward from the cradle 28 and aligned with the cable clamp 30 just outside of its boundaries. This third clamping strategy 114 causes deformation and potentially slight puncturing of a sheath of the weld cable 100 and also may cause slight bending of the weld cable 100 to secure the weld cable 100. A fourth clamping strategy 120 includes a similar arrangement to that of the third strategy 114 with the walls, teeth, or ribs 104 aligned slightly further outside of the boundaries of the cable clamp 30. This allows the weld cable 100 to conform without the extent of deformation associated with the third clamping strategy 114. It should be noted that these are merely exemplary and other strategies may also be employed in accordance with present embodiments.

Turning back to the specific embodiment illustrated in FIG. 3, the cradle 28 of FIG. 3 includes a series of walls 130 (like element 104) that extend into the internal volume of the housing 12 and that are bounded by sidewalls 132. These cooperate with the cable clamp 30 (e.g., ribs of the cable clamp 30) to engage the weld cable and resist movement of the weld cable relative to the housing 12. Furthermore, the walls 130, 132 define the cradle 28 and it should be noted that the volume adjacent the cradle 28 is designed to accommodate cabling that can freely move within the housing 12 (as opposed to the secured weld cable).

Figure 5:
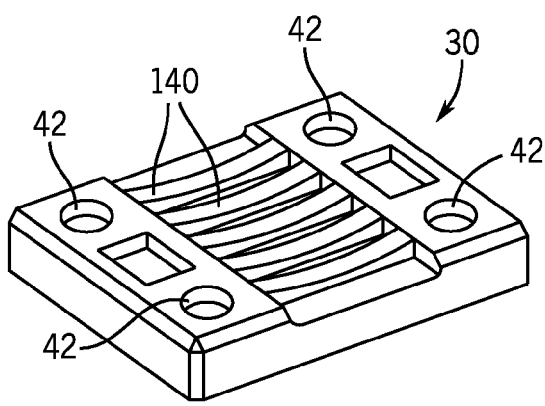
FIG. 5 is a perspective view of the cable clamp of FIG. 3 with a ribbed side facing upward in accordance with present embodiments.
Figure 6:
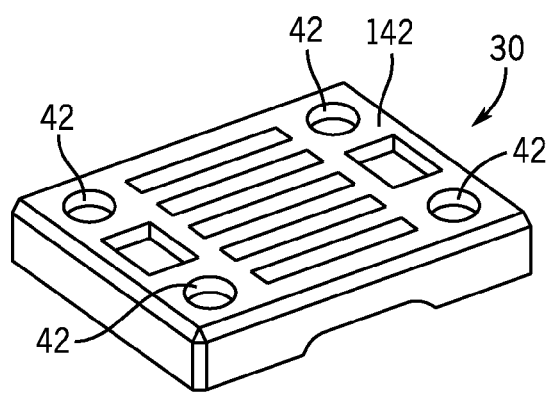
FIG. 6 is a perspective view of the cable clamp of FIG. 3 with a flat side facing upward in accordance with present embodiments.
Figure 7:
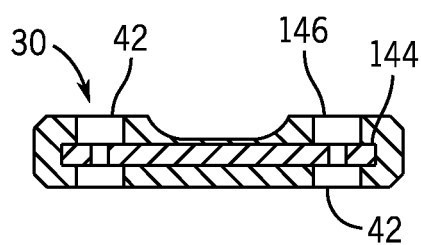
FIG. 7 is a cross-sectional view of the cable clamp of FIG. 3 showing a steel core and outer protective layer of the cable clamp in accordance with present embodiments.

As best illustrated in FIGS. 5 and 6, which include perspective views of the cable clamp 30, the cable clamp 30 is reversible and includes asymmetric geometric features for coupling with weld cables of different sizes. Specifically, recessed ribs 140 illustrated in FIG. 5 may function to accommodate a larger weld cable, while the flat surface 142 illustrated in FIG. 6 may be utilized to engage a smaller weld cable. It should be noted that the ribs 140 may also serve structural purposes associated with strengthening the cable clamp 30. However, other characteristics of the cable clamp 30 may provide strength as well. For example, FIG. 7 provides a cross-sectional view of the cable clamp of FIG. 3, which illustrates a steel core 144 about which a plastic coating 146 is disposed. The steel core 144, which may be representative of numerous different materials, may strengthen the cable clamp 30 and resist deformation of the cable clamp 30 when tightly pressed against the weld cable. With regard to the plastic coating 146, which may be representative of numerous different coating materials, it may serve to resist damaging the weld cable when tightly engaged.

Figure 8:
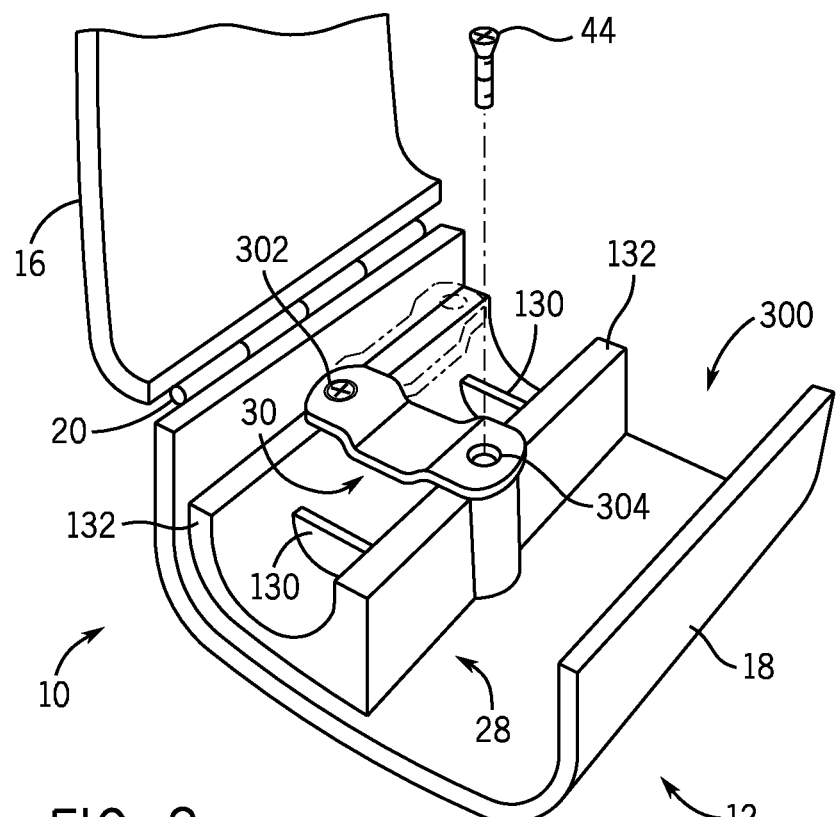
FIG. 8 is a perspective view of a housing coupled with a rotatable cable clamp that includes a U-shaped bracket in accordance with present embodiments.
Figure 9:
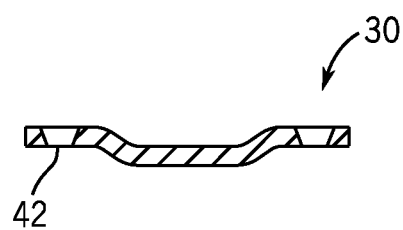
FIG. 9 is a cross-sectional view of the U-shaped bracket that functions as the cable clamp of the embodiment shown in FIG. 8 in accordance with present embodiments.

FIG. 8 is a perspective view of another embodiment of the cable management system 10 including the housing 12 with a clam-shell arrangement of the first and second shells 16, 18 rotatably coupled about the hinge 20. In this embodiment, the cradle 28 includes the walls 130, 132 like the embodiment illustrated in FIG. 3. FIG. 8 better illustrates the volume adjacent the cradle 28, which is labeled by reference numeral 300 in FIG. 8. This volume 300 is designed to accommodate cabling such that it can essentially move freely within the housing 12 as opposed to being engaged by the cradle 28 and cable clamp 30. FIG. 8 also illustrates a different embodiment of the cable clamp 30 relative to previously discussed embodiments. Indeed, the cable clamp 30 of FIG. 8 includes a metal bracket that is capable of being rotated about a first connection point 302 to facilitate installation of the weld cable within the cradle 28 and to allow a user to more easily secure the cable clamp 30 with a second connection point 304. The cable clamp 30 of FIG. 8 is also different because it is substantially U-shaped. This is better shown in FIG. 9, which is a cross-sectional view of the cable clamp 30 of FIG. 8. As with previous embodiments, this U-shaped metal bracket is reversible and can be utilized to engage small or large weld cables. When the cable clamp 30 is utilized in the orientation shown in FIG. 8, it can couple with a smaller weld cable while reversing it will accommodate a larger weld cable.

Figure 10:
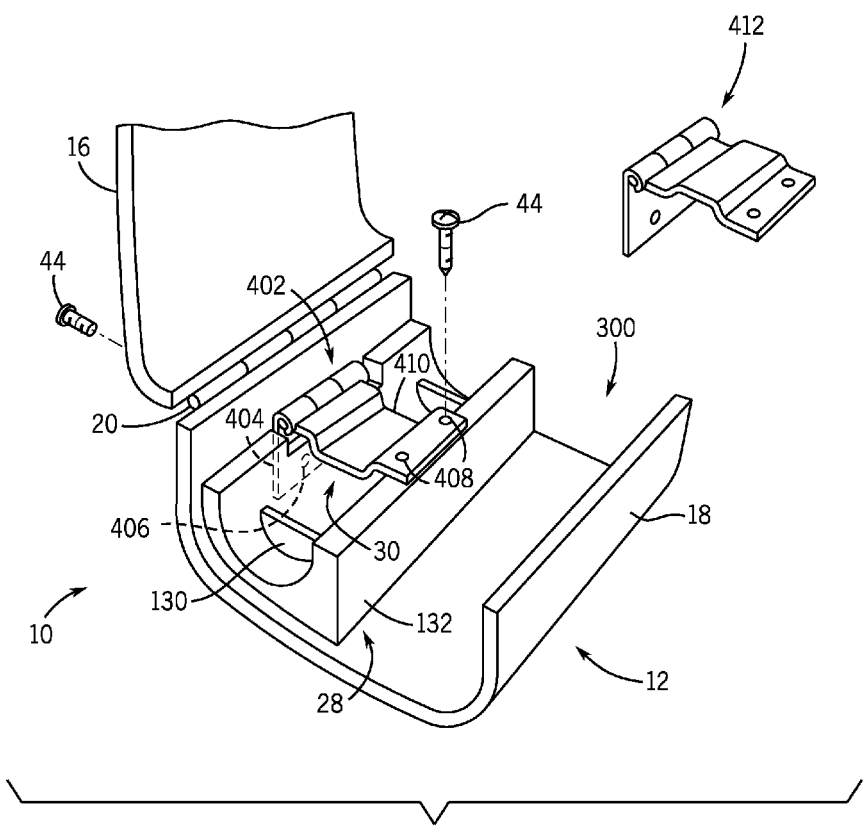
FIG. 10 is a perspective view of a housing coupled with a hinged cable clamp in accordance with present embodiments.
Figure 11:
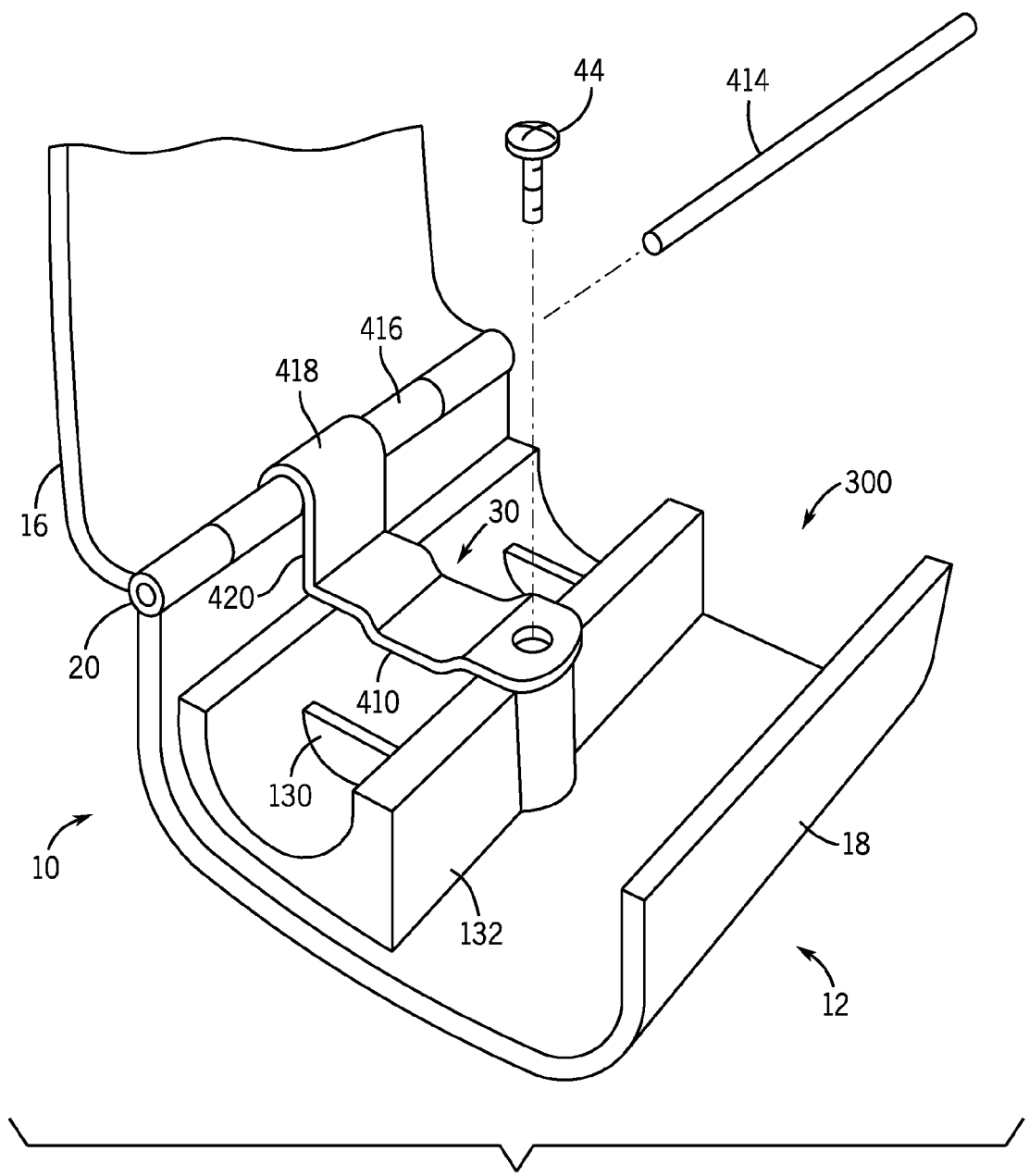
FIG. 11 is a perspective view of a housing coupled with a hinged cable clamp having a U-shaped bracket such that a hinge between first and second shells of the housing shares a hinge pin with the hinged cable clamp in accordance with present embodiments.
Figure 12:
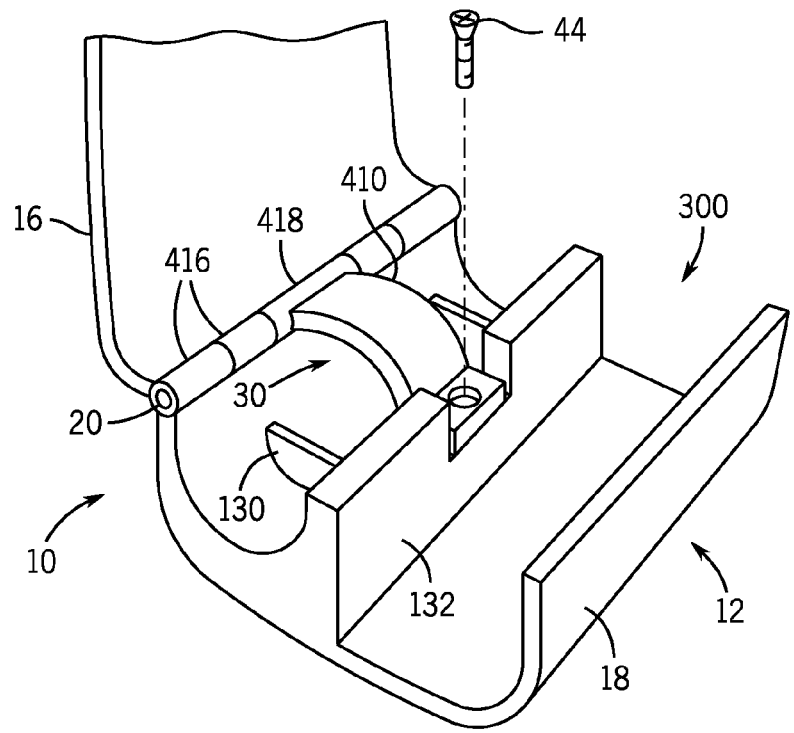
FIG. 12 is a perspective view of a housing coupled with a hinged cable clamp including a plastic strap such that a hinge between first and second shells of the housing shares a hinge pin with the hinged cable clamp in accordance with present embodiments.

FIG. 10 is a perspective view of yet another embodiment of the cable management system 10. This embodiment is much like the embodiment illustrated in FIG. 8. As with the embodiment illustrated in FIG. 8, the cable clamp 30 includes a substantially U-shaped cross-section. However, rather than rotating about the first connection point 302, the cable clamp 30 includes a hinge 402 and hinge plate 404 that can be installed inside the housing 12 to facilitate rotatable engagement with other features of the cable management system 10 to secure the weld cable within the housing 12. In the illustrated embodiment, the cable clamp 30 may be secured to the housing 12 via engagement features 406 in the hinge plate 404, engagement features 408 in a bracket portion 410 of the cable clamp 30, and fasteners 44. The cable clamp of FIG. 10 may also be reversed or inverted to accommodate different sizes of the weld cable. For example, reference numeral 412 indicates a reversed version of the cable clamp 30 that is installed in the housing 12 of FIG. 10. In other embodiments, as illustrated in FIG. 11, the cable clamp 30 may share the same hinge 20 as the housing 12. Indeed, as shown in FIG. 11, a hinge pin 414 of the hinge 20 may pass through barrels 416 of the first and second shells 16, 18 and a barrel 418 of the cable clamp 30. In the embodiment illustrated in FIG. 11, the cable clamp 30 includes a neck portion 420 that extends from the bracket portion 410 to facilitate coupling of the barrel 418 with the hinge pin 414. However, in yet other embodiments, as illustrated in FIG. 12, the cable clamp 30 may include different shapes and geometries. For example, the cable clamp 30 illustrated in FIG. 12 includes a plastic strap with the barrel 418 integrated and including a rounded geometry for the bracket portion 410.

Figure 13:
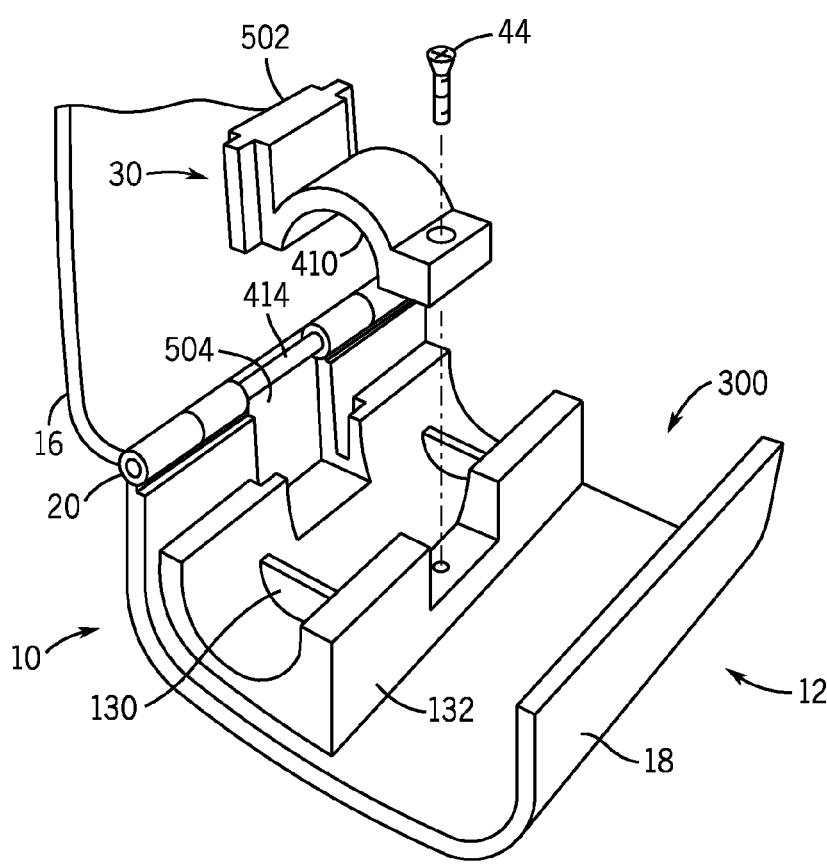
FIG. 13 is a perspective view of a housing including a slot and receiving a key body of a cable clamp in accordance with present embodiments.
Figure 14:
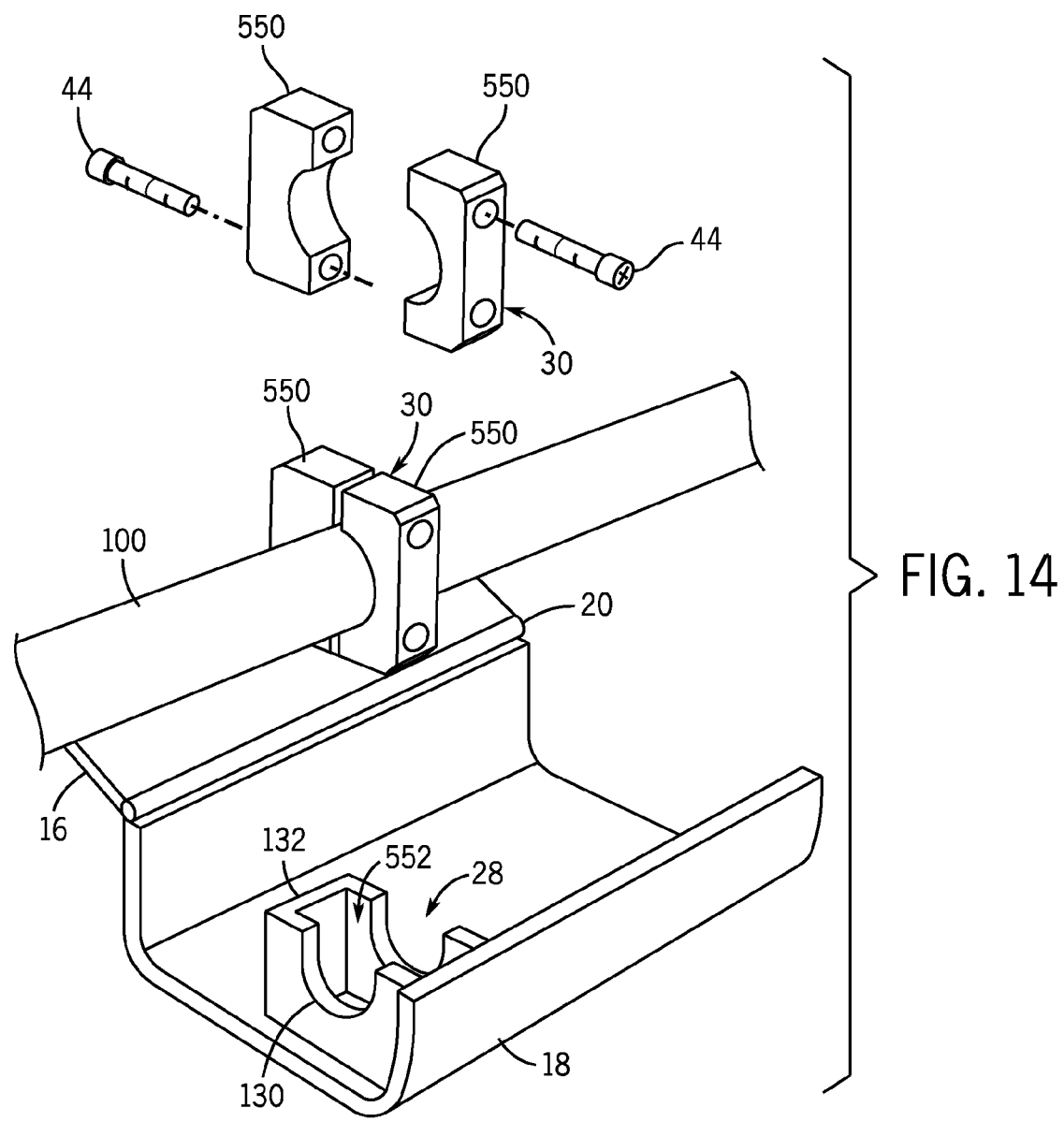
FIG. 14 is a perspective view of a housing including a slot configured to receive a cable clamp, wherein the cable clamp includes two components capable of coupling about a cable in accordance with present embodiments.
Figure 15:
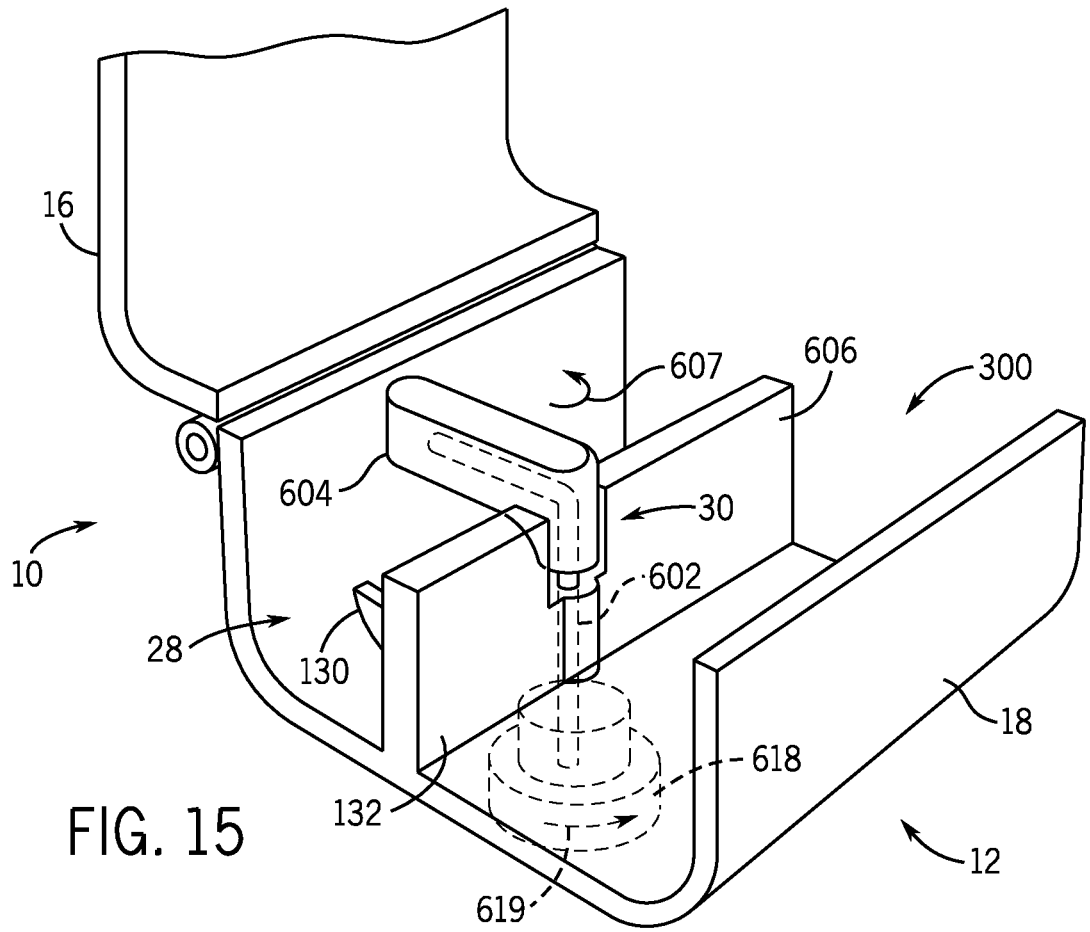
FIG. 15 is a perspective view of a housing coupled with a cable clamp including a J-hook structure in accordance with present embodiments.

FIGS. 8 and 10-12 include embodiments with pivot or hinging features associated with the cable clamp 30. The pivot or hinge action provided by such embodiments may enable efficient force transfer from the cable clamp 30 to the weld cable. Further, the pivot and hinge features enable efficient access to the cradle 28, which provides accessibility for maintenance, installation, repair and so forth. Other embodiments may also facilitate efficient force transfer and efficient access. Examples of such embodiments are shown in FIGS. 13-15. For example, FIG. 13 illustrates an embodiment of the cable management system similar to that in FIG. 12. However, rather than include a hinging mechanism like the embodiment of FIG. 12, the cable clamp 30 of FIG. 13 includes a key body 502 and the housing 12 includes a slot 504 designed to receive the key body 502. The key body 502 is sized to extend to a top of the internal volume of the housing 12 such that positioning the first and second shells 16, 18 in the closed configuration 24 traps the key body 502 within the slot 504. Specifically, the first shell 16 prevents the key body 502 from sliding out of the slot 504 when the housing 12 is closed.

In another embodiment, as illustrate in FIG. 14, the cable clamp 30 is configured to be secured around the weld cable 100 to create a frictional engagement with the weld cable 100 and to be disposed within the cradle 28. In such embodiments, the cable clamp 30 may be a single piece configured to wrap around the weld cable 100 or multiple components configured to couple together via fasteners 44 to clasp the weld cable 100. Specifically, in FIG. 14, the cable clamp 30 includes two separate brackets 550 configured to be coupled about the weld cable 100. Once coupled together, the brackets 550 can be slid into the cradle 28, which includes a slot 552 designed to receive the weld cable 100 and the assembled brackets 550. The boundaries of the slot 552 engage the brackets 550 and prevent them from moving relative to the housing 12 while the slot 552 is engaged with the brackets 550. Because the brackets 550 are securing the weld cable 100, the weld cable 100 is also substantially prevented (some slippage may occur relative to the brackets 550) from moving relative to the housing 12. Further, the brackets 550 may be sized such that closing the housing 12 prevents the brackets 550 from sliding out of engagement with the slot 552. In other embodiments, different features may be utilized to maintain the brackets 550 within the slot 552.

Present embodiments may facilitate securing the weld cable within the housing 12 by tightening the cable clamp 30 with respect to the cradle 28 without using tools. That is, the cable management system 10 may include features for securing the weld cable between the cable clamp 30 and cradle 28 toollessly. Such an embodiment is illustrated if FIG. 15, wherein the housing 12 is similar to that of FIG. 12. However, in the embodiment of FIG. 15, the cable clamp 30 includes features that form a J-hook. Specifically, as shown in FIG. 15, the cable clamp 30 includes a neck portion 602 and an arm portion 604 that are transverse (e.g., substantially perpendicular) to one another and combine to form the J-hook shape.

Figure 16:
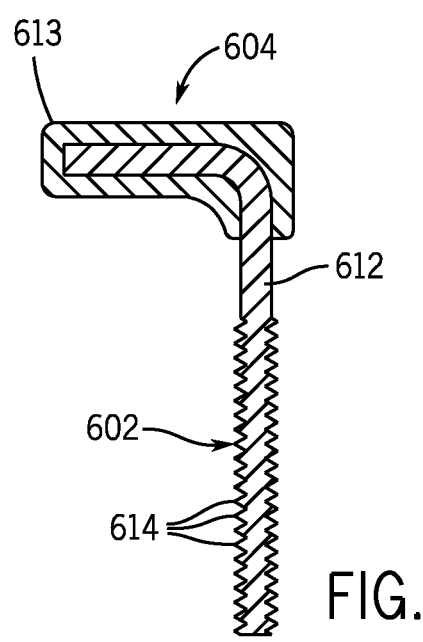
FIG. 16 is a cross-sectional view of the J-hook structure of FIG. 15 illustrating a steel core and overmold forming a portion of an arm of the J-hook in accordance with present embodiments.

The arm portion 604 may rest on a wall 606 of the cradle 28 in an open orientation for receiving the weld cable. Once the weld cable is placed in the cradle 28, the arm portion 604 can be rotated (as illustrated by arrow 607) over the weld cable and cradle 28 to initiate engagement of the weld cable between the cable clamp 30 and cradle 28. The neck portion 602 extends through a barrel 608 formed in the second shell 18 along the wall 606 of the cradle 28. As clearly illustrated in FIG. 16, which is a cross-sectional view of the J-hook configuration of the cable clamp 30, the neck portion 602 and arm portion 604 may be formed from a single steel insert 612 that is bent. Further, the arm portion 604 may include an overmolded material (e.g., plastic) 613 to protect the weld cable, and the neck portion 602 may include threads 614 to facilitate pulling the arm portion 604 into contact with the weld cable and tightening the engagement of the weld cable between the cable clamp 30 and cradle 28 by turning a nut 618 (as indicated by arrow 619) that engages the threads 614. In the illustrated embodiment, the nut 618 is external to the housing 12. However, in other embodiments, the nut may be inlaid in a recess within the housing 12 or otherwise positioned to facilitate toolless tightening.

Some embodiments may not include a clam-shell configuration of the housing 12. For example, the cable management system 10 illustrated in FIG. 17 includes the first and second shells 16, 18 in a plug and outer shell arrangements. Indeed, the first shell 16 includes an outer shell 802 and the second shell 18 includes a plug 804. The plug 804 in the illustrated embodiment includes a plurality of cradles 28 that are formed by open channels along the length of the plug 804. Thus, the plug 804 is specifically designed to hold a particular number of cables and to receive the cables along the perimeter of the plug 804 through the open channels of the cradles 28. However, in other embodiments, the plug 804 may include a single cradle for the weld cable and a large cavity for a plurality of additional cables. In the illustrated embodiment, the weld cable can be slid into the lowest cradle 28, which is indicated by reference numeral 808. This particular cradle 808 is arranged to align with the cable clamp 30, which is a ramp clamp 812 that is integral with the outer shell 802 in the illustrated embodiment. Specifically, the ramp clamp 812 includes a toothed ridge along an interior wall 814 of the outer shell 802. Teeth 816 of the ramp clamp 812 are arranged to engage with the weld cable to resist movement of the weld cable relative to the housing 12. This is better illustrated by the cross-sectional views provided in FIG. 18, which show the weld cable 100 installed in the plug 804. Further, FIG. 18 shows the plug 804 and outer shell 802 in both an uncoupled configuration 822 and a coupled configuration 824. In the coupled configuration, the ramp clamp 812 is engaged with the weld cable 100 and pressed toward the weld cable 100 by the friction fit of the plug 804 and outer shell 802. Indeed, the plug 804 may be made of a flexible material (e.g., rubber) and the outer shell 802 a more rigid material (e.g., plastic) or some other combination of materials that encourages pressure between the two components upon engagement.

The engagement between the weld cable 100 and the ramp clamp 812 may be strengthened by applying the band clamp 66 (which is representative of a number of potential fasteners) about the outer shell 802. The outer shell 802 and plug 804 may include material and geometry that facilitate compression of the outer housing 802 and plug 804 by the band clamp 66. For example, in the illustrated embodiment, the outer shell 802 includes a gap 830 and a living hinge 832 that encourage flexibility about and axis of the outer shell 802 and axial compression. When the band clamp 66 is installed, these features enable further pressing of the outer shell 802 and the plug 804 together and pressing the ramp clamp 812 into a solid engagement with the weld cable 100. It should be noted that the same band clamp 66 may be utilized to secure the protective cable sheath 14 to the port structure 60 of the housing 12.

Figure 17:
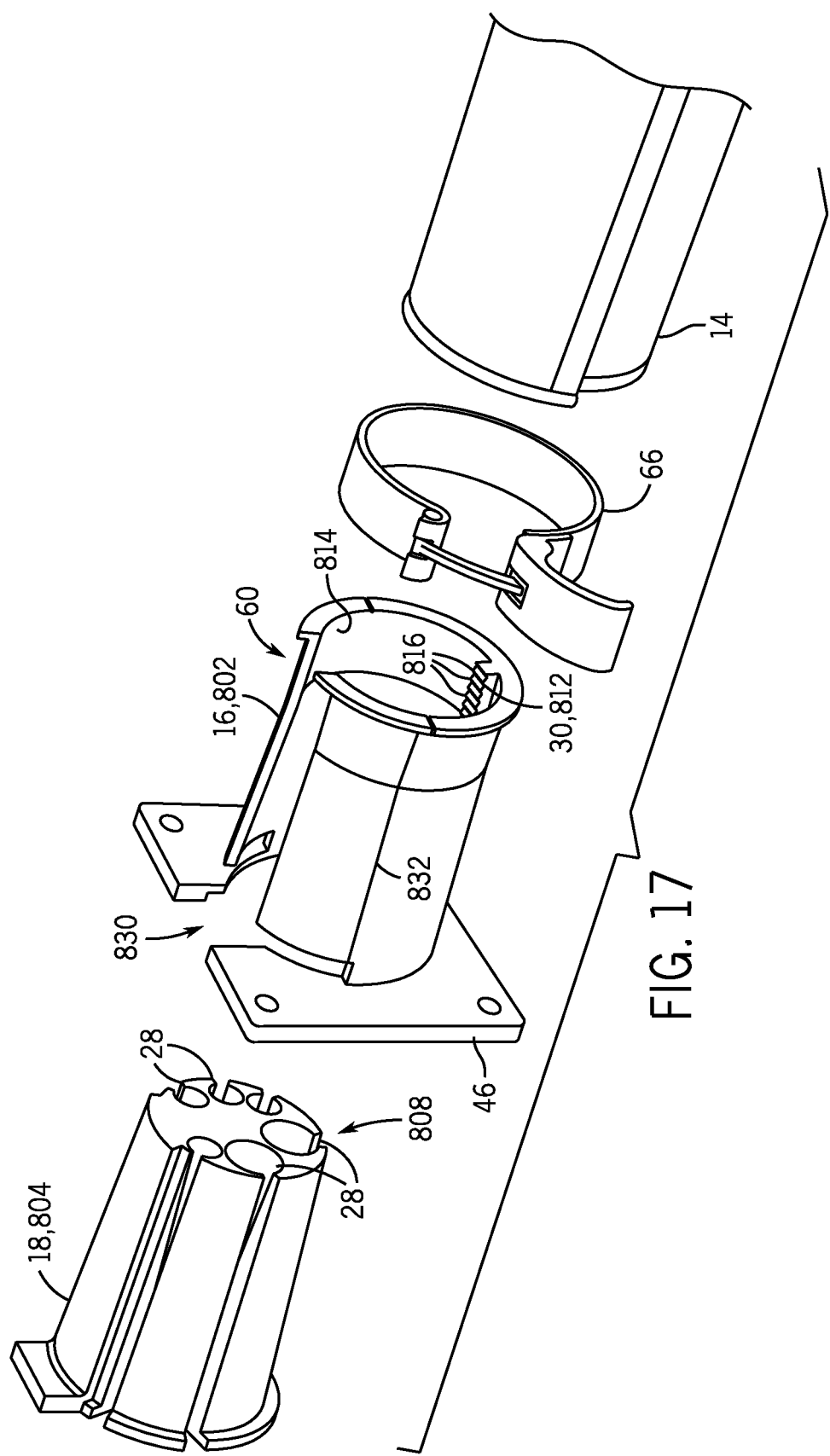
FIG. 17 is a perspective view of a cable management system including a housing and a protective cable sheath, wherein the housing includes a plug and outer shell and wherein the housing is decoupled from the protective cable sheath in accordance with present embodiments.
Figure 18:
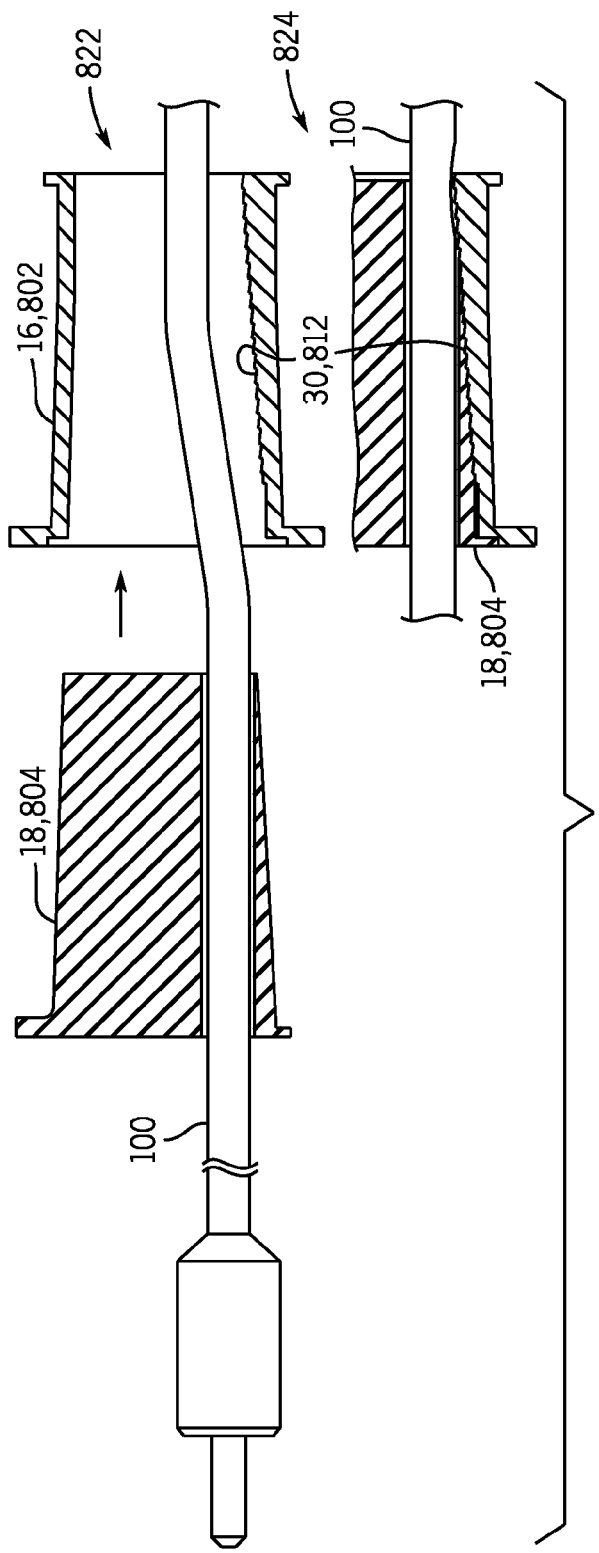
FIG. 18 is a cross-sectional view of the housing of FIG. 17 including a weld cable disposed therein in accordance with present embodiments.
Figure 20:
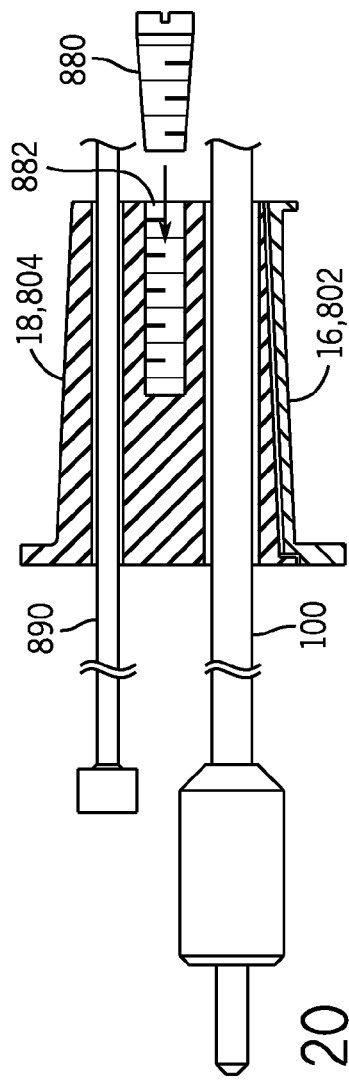
FIG. 20 is a cross-sectional view of the housing of FIG. 19 including a weld cable and another cable disposed therein in accordance with present embodiments.
Figure 19:
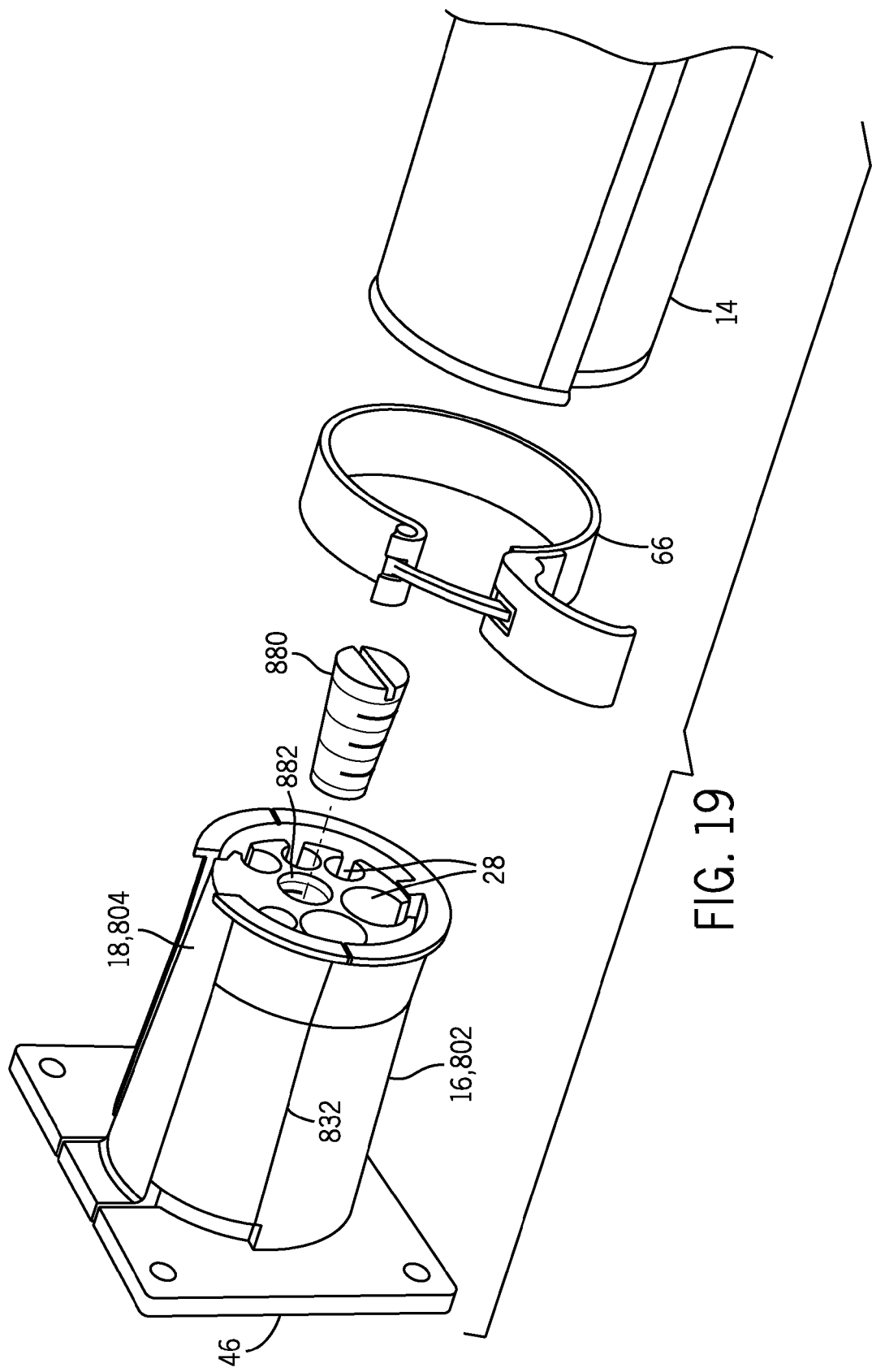
FIG. 19 is a perspective view of a cable management system including a housing and a protective cable sheath, wherein the housing includes a plug and outer shell and wherein the housing is decoupled from the protective cable sheath in accordance with present embodiments.

FIG. 19 illustrates an embodiment of the cable management system 10 that is similar to the embodiment illustrated in FIGS. 17 and 18. However, in the embodiment illustrated by FIG. 19, the cable clamp 30 includes a threaded insert 880 instead of the ramp clamp 812. In other embodiments, both the ramp clamp 812 and threaded insert 880 may be employed together. The threaded insert 880 may be inserted into a threaded receptacle 882 of the plug 804 such that the perimeter of the plug 804 is pressed outward into engagement with the weld cable 100 when installed the threaded insert 880 is installed, as better illustrated in FIG. 20. Specifically, as illustrated in the cross-sectional view provided by FIG. 20, the geometry of the threaded insert 880 may include a frustum. Thus, as the threaded insert 880 further progresses into the threaded receptacle 882, the more the plug 804 (which may be made of a flexible material such as rubber) is deformed and the tighter the engagement with the weld cable 100 and other cabling 890 disposed in the plug becomes.

Figure 21:
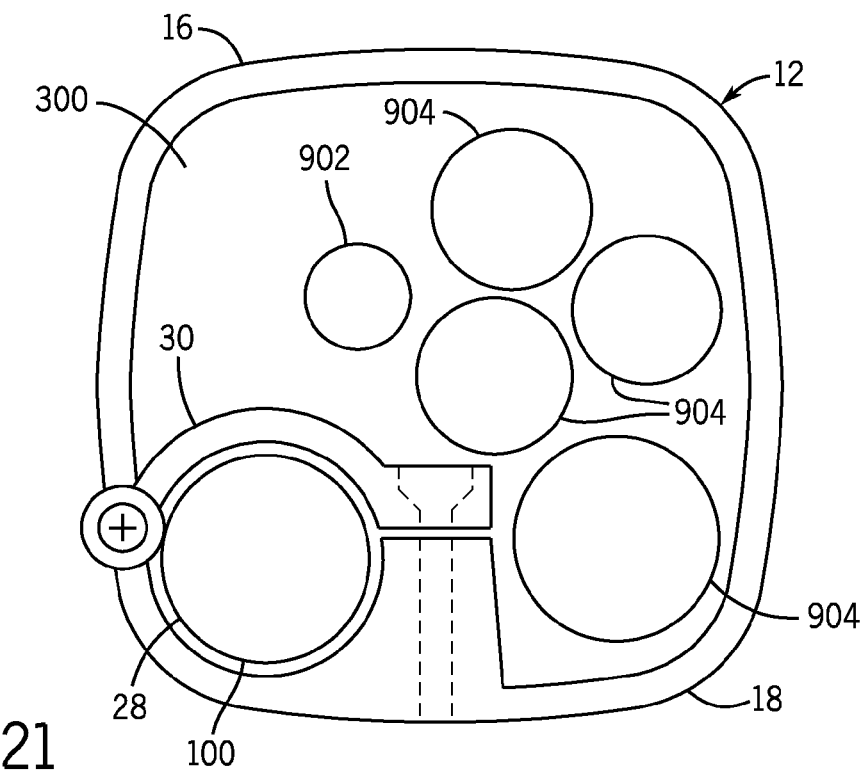
FIGS. 21 and 22 include cross-sectional views of housings including cabling disposed therein and having different opening orientations in accordance with present embodiments.
Figure 22:
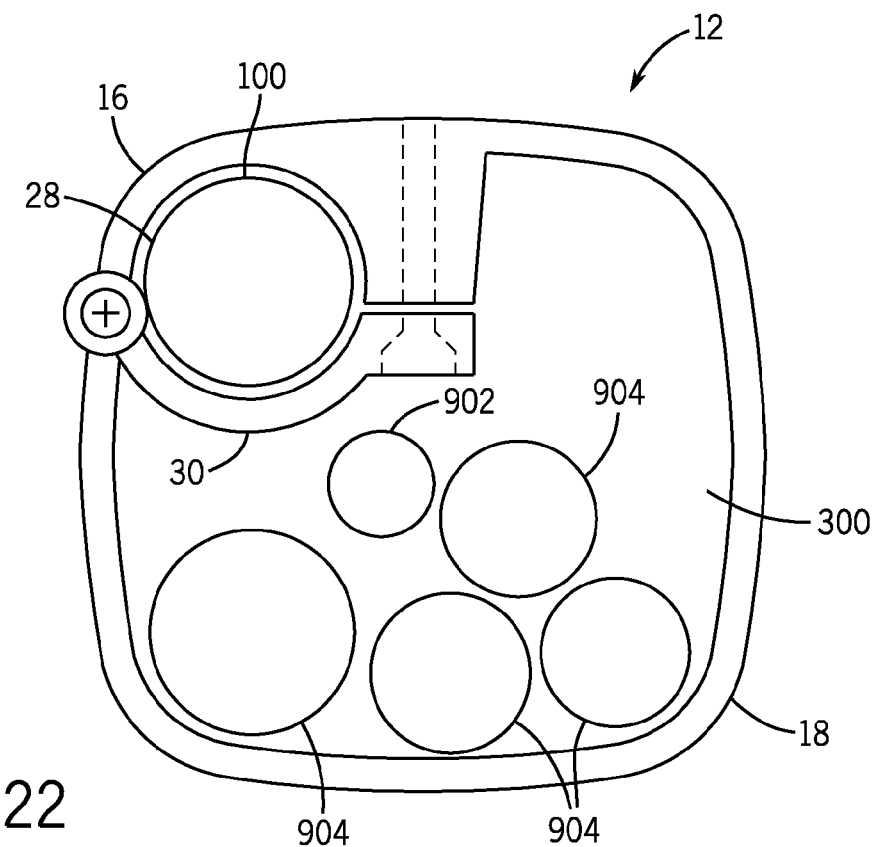

Ready access (e.g., hinged access) to the housing 12 and the slit 80 of the protective cable sheath 14 may enable all the cabling to be installed prior to assembly of the cable management system 10 with the welding system. The installation process may include opening the housing 12 about the hinge 20 to expose the cradle 28. The weld cable 100 may be placed within the cradle 28, and the cable clamp 30 may be secured over the weld cable. If the cable clamp 30 is reversible or otherwise adjustable, it may be adjusted based on a size of the weld cable 100 to facilitate proper engagement. Additionally, any other cabling (e.g., control cable, gas hoses, water hoses, etc.) or other free floating connection components may be placed within the housing 12. Specifically, as illustrated in FIGS. 21 and 22, the control cable 902 may be placed along with other cabling 904 within the housing 12 outside of the cradle 28 and in the volume 300 such that it remains essentially free floating with respect to the housing 12.

The weld cable 100 may then be secured to the housing 10 via the cradle 28 and cable clamp 30 such that movement of the weld cable is restricted with respect to the housing 12. This may be achieved in a variety of manners, as discussed above. For example, FIGS. 21 and 22 show cross-sectional views of the housing 12 with different opening orientations but both including the weld cable 100 in the cradle 28 and engaged by the cable clamp 30 while the control cable 902 and other cabling 904 are in the volume 300 and essentially free floating. The first and second shells 16, 18 of the housing 12 may be engaged and sealed along the non-hinged edges via fasteners 26. This may actually serve a dual purpose of sealing the housing 12 and securing the weld cable 100 between the cradle 28 and the cable clamp 30. Thus, present embodiments facilitate installation of cabling for a welding system in the cable management system 10 without requiring that the cabling be threaded through the housing 12.

Simultaneously or independently of the process discussed above with respect to installation of cabling in the housing 12, the length of the protective cable sheath 14 may be measured to hold the cabling. That may include measuring to ensure the protective cable sheath 14 will overlap an inlet (e.g., the port structure 60) of the housing 12. In an un-sealed (e.g., flat) orientation, the protective cable sheath 14 may be placed proximate the cabling. The protective cable sheath 14 may be sealed along its slit 80 such that the cabling is enclosed within the circular continuity of the protective cable sheath 14. Sealing may be accomplished by at least one mode of closure as listed above. An end of the sealed (e.g., tubular) protective cable sheath 14 may be placed over the port structure 60 or other inlet, such that the protective cable sheath 14 overlaps the housing 12. The band clamp 66 or another clamping feature may be used to couple the protective cable sheath 14 to the housing 12. This clamp may prevent slippage and provide a secure seal to further prevent contamination of the cabling. In some embodiments, a second, third, fourth, or further mode of closure may be applied to the protective jacket to provide a secure seal.

There are numerous advantages achieved by present embodiments. For example, present embodiments provide reliability in the day-to-day action of welding with a remote wire feeder/control box by managing strain on the control cable or other less robust cables in typical welding systems. This is achieved by transferring the majority of the stress/strain to the weld cable, which is more robust than some cables. As such, the failure rate of the control cable or other less robust cables is reduced. Further, with all the cabling combined into a single umbilical, the potential for the cables to be "snagged" on obstacles within a work environment is reduced, thus further limiting the possibility of damage to equipment. As another example, present embodiments provide ready and efficient access. Indeed, in view of present embodiments, there is no need to thread components, weld cable, control cable, gas hose, water hose through strain relief features or a protective jacket prior to final assembly.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein, the disclosure is intended to cover all combinations.

The invention claimed is:

1. A welding system, comprising:
   a housing comprising a first shell and a second shell configured to couple together about welding system cabling such that a portion of the welding system cabling is contained by the housing, wherein the first and second shells form openings at first and second lengthwise ends of the housing such that the welding system cabling is capable of extending through the openings and such that edges of the openings enclose a perimeter of the welding system cabling when the first and second shells are coupled together about the welding system cabling;
   a cradle configured to receive a weld cable of the welding system cabling, wherein the cradle comprises a first set of engagement features configured to engage a weld cable, and wherein the cradle is integral to the second shell;
   a cable clamp comprising a second set of engagement features configured to engage the weld cable and cooperate with the cradle to restrict movement of the weld cable when the weld cable is disposed in the cradle and the cable clamp is coupled to the cradle with the second set of engagement features extending toward the cradle, wherein the cable clamp comprises a reversible geometry such that positioning a first side of the cable clamp toward the cradle creates a smaller space between the cradle and the cable clamp than positioning a second side of the cable clamp toward the cradle; and
   an unrestricted area within the housing, the unrestricted area being adjacent to the cradle and configured to receive one or more additional cables of the welding system, wherein the unrestricted area extends from the first lengthwise end of the housing to the second lengthwise end of the housing.

2. The welding system of claim 1, wherein the housing comprises a hinge coupling an edge of the first shell to an edge of the second shell.

3. The welding system of claim 1, comprising a band clamp configured to engage an outer perimeter of the housing and a protective cable sheath, and to compress the housing and the protective cable sheath.

4. The welding system of claim 1, wherein the housing facilitates movement of a plurality of cables of the welding system cabling within the unrestricted area of the housing.

5. The welding system of claim 1, wherein the cable clamp is removable from the housing and includes engagement features configured to couple with corresponding engagement features of the housing.

6. The welding system of claim 1, wherein the cable clamp is coupled with the housing via a hinge of the housing and wherein the cable clamp is configured to rotate about the hinge between an engaged configuration for engaging the weld cable and a disengaged configuration for facilitating positioning of the weld cable.

7. The welding system of claim 1, wherein the openings comprise a first opening adjacent a mounting plate of the housing configured to couple with a power supply or wire feeder of the welding system and a second opening through a port structure of the housing configured to facilitate coupling of the housing with a protective cable sheath.

8. The welding system of claim 1, comprising a protective cable sheath configured to couple with the housing about a port structure of the housing, wherein the protective cable sheath comprises a zipper along a length of the protective cable sheath and fastening tape configured to secure the protective cable sheath about a portion of the welding system cabling that extends out of the housing.

9. The welding system of claim 1, comprising the welding cable extending through the cradle and engaged between the cradle and the cable clamp such that the weld cable is bent or compressed by the cradle and cable clamp; and a control cable extending through the unrestricted area.

10. The welding system of claim 1, wherein the cradle and cable clamp are configured to focus stresses associated with movement of the welding system cabling on the weld cable and the housing.

11. The welding system of claim 1, wherein the first set of engagement features and the second set of engagement features engage the weld cable in an offset arrangement.

12. The welding system of claim 1, wherein the cable clamp comprises a third set of engagement features, extending opposite the second set of engagement features, configured to engage a differently sized weld cable when the cable clamp is installed such that the third set of engagement features face the first set of engagement features.

13. The welding system of claim 3, wherein the housing comprises a lip portion configured to engage the band clamp.

14. The welding system of claim 8, comprising a band clamp configured to engage the protective cable sheath and the port structure of the housing to secure the protective cable sheath to the housing in a frictional engagement.

15. A cable management system for a welding system, comprising:
   a housing comprising a first shell and a second shell configured to be positioned around welding system cabling and coupled together by a hinge such that a portion of the welding system cabling is enclosed by the housing and a portion of the welding system cabling extends out of at least one end of the housing;
   a cradle integral to the second shell, wherein the cradle comprises a first set of engagement features configured to engage a weld cable of the weld system cabling;
   a cable clamp comprising a second set of engagement features configured to cooperate with the cradle to restrict movement of the weld cable within the housing disposed in the cradle and the cable clamp is coupled to the cradle with the second set of engagement features extending toward the cradle, wherein the cable clamp comprises a reversible geometry such that positioning a first side of the cable clamp toward the cradle creates a smaller space between the cradle and the cable clamp than positioning a second side of the cable clamp toward the cradle; and
   an unrestricted area within an internal volume of the housing, the unrestricted area being adjacent the cradle and configured to receive additional cables of the welding system cabling, wherein the unrestricted area extends from a first lengthwise end of the housing to a second lengthwise end of the housing.

16. The cable management system of claim 15, wherein the cable clamp is configured to be secured around the weld cable to create a frictional engagement with the weld cable and configured to be disposed within a recess formed by the cradle.

17. The cable management system of claim 15, comprising a mounting plate extending from a portion of the housing in a perpendicular or parallel orientation with respect to a length of the housing and configured to couple with a power supply or a wire feeder of the welding system.

18. The cable management system of claim 15, comprising a protective cable sheath configured to couple with the housing about a port structure of the housing, wherein the protective cable sheath comprises a zipper along a length of the protective cable sheath and fastening tape configured to secure the protective cable sheath about the portion of the welding system cabling that extends out of the housing.

19. The cable management system of claim 15, wherein the first set of engagement features and the second set of engagement features engage the weld cable in an offset arrangement.

* * * * *